United States Patent
Vareljian et al.

(10) Patent No.: US 10,164,802 B1
(45) Date of Patent: *Dec. 25, 2018

(54) FULL BRIDGE DECISION FEEDBACK EQUALIZER

(71) Applicants: Albert Vareljian, Folsom, CA (US); Vassili Kireev, San Jose, CA (US)

(72) Inventors: Albert Vareljian, Folsom, CA (US); Vassili Kireev, San Jose, CA (US)

(73) Assignees: Albert Vareljian, Folsom, CA (US); Vassili Kireev, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/345,214

(22) Filed: Nov. 7, 2016

Related U.S. Application Data

(63) Continuation of application No. 14/982,681, filed on Dec. 29, 2015, now Pat. No. 9,491,009, which is a continuation of application No. 14/281,562, filed on May 19, 2014, now Pat. No. 9,231,793.

(51) Int. Cl.
*H04L 25/03* (2006.01)

(52) U.S. Cl.
CPC ............ *H04L 25/03057* (2013.01)

(58) Field of Classification Search
CPC ........... H04L 2025/0349; H04L 25/067; H04L 25/03019; H04L 25/03057; H03H 11/26; H04B 3/235
See application file for complete search history.

(56) References Cited

U.S. PATENT DOCUMENTS

| | | | |
|---|---|---|---|
| 6,035,320 A | 3/2000 | Kiriaki et al. | |
| 6,370,190 B1 * | 4/2002 | Young | H04L 25/03057 341/110 |
| 7,483,479 B2 | 1/2009 | Cellicotte et al. | |
| 7,676,009 B2 | 3/2010 | Yen et al. | |
| 7,782,935 B1 | 8/2010 | Wong et al. | |

(Continued)

OTHER PUBLICATIONS

Bulzacchelli, J., "Design Techniques for CMOS Backplane Transceivers Approaching 30-GB / s Data Rates", Custom Integrated Circuits Conference (CICC), 2013 IEEE, p. 1-8.

(Continued)

*Primary Examiner* — Vineeta S Panwalkar

(74) *Attorney, Agent, or Firm* — Womble Bond Dickinson (US) LLP

(57) ABSTRACT

A decision feedback equalizer (DFE) is provided. The DFE includes an analog front end, configured to receive a digital communication signal having amplitude modulation greater than two-level, and to output a feedforward signal based on the digital communication signal. The DFE includes a summing block, configured to receive the feedforward signal, a plurality of delayed data decisions as digital signals, and a plurality of adapted coefficients. The summing block is configured to produce an analog feedback signal as an analog subtraction from the feedforward signal of each of the plurality of delayed data decisions multiplied by a corresponding one of the plurality of adapted coefficients. The DFE includes a delay chain configured to produce the plurality of delayed data decisions based on the analog feedback signal, each of the plurality of delayed data decisions having two or more bits, corresponding to the amplitude modulation being greater than two-level.

20 Claims, 11 Drawing Sheets

(56) References Cited

U.S. PATENT DOCUMENTS

| | | |
|---|---|---|
| 7,974,337 B2 | 7/2011 | Momtaz et al. |
| 8,050,318 B2 | 11/2011 | Phanse et al. |
| 8,477,833 B2 | 7/2013 | Bulzacchelli et al. |
| 8,743,945 B2 | 6/2014 | Aziz et al. |
| 8,804,809 B2 | 8/2014 | Raphaeli et al. |
| 9,231,793 B1 | 1/2016 | Vareljian et al. |
| 9,491,009 B1 | 11/2016 | Vareljian et al. |
| 2012/0192023 A1 | 7/2012 | Lee et al. |

OTHER PUBLICATIONS

Ibrahim, S. and Razavi, B., "Low-Power CMOS Equalizer Design for 20-GB / s Systems", IEEE Journal of Solid-State Circuits, Jun. 2011, p. 1321-1336, vol. 46(6).

U.S. Appl. No. 15/345,214, filed Nov. 7, 2016, Full Bridge Decision Feedback Equalizer, Albert Vareljian.

* cited by examiner

FULL BRIDGE DECISION FEEDBACK EQUALIZER

BACKGROUND

Decision feedback equalizer (DFE) circuits are broadly used in wireline, wireless and optical data communication systems for purposes of signal recovery distorted during propagation through lossy and dispersive channels. For high speed digital communication systems above 10 Gb/s (gigabits per second) mixed-signal decision feedback equalizer remains the most power efficient solution for data recovery. Most of mixed-signal DFEs were intended for operation with two-level modulation (e.g., two-level pulse amplitude modulation PAM2 or non-return-to-zero NRZ) schemes, whereby the performance is mainly assessed based on geometrical "eye-opening" properties. This is intuitively connected to the target bit-to-error ratio (BER) by the setting of the horizontal and vertical "eye-opening" with respect to the comparator sensitivity threshold. However, from mathematical criteria based on data communication theory, the target BER is determined by the signal-to-noise ratio (SNR) at the detector (slicer) input. For example, to achieve a BER=$10^{-12}$ required by present data communication standards, the SNR should be set to approximately 17 dB for PAM2 modulation. Under this moderate requirement the performance of many receiver analog frontends (AFEs) and mixed signal DFEs is adequate in terms of swing, linearity and noise. However, with continued growing demands for faster speeds of data communication over band limited channels (for example, the recent development of a 400 Gb/s IEEE Standard 802.3bs), the need for a higher than PAM2 modulation index, multilevel format becomes inevitable. Furthermore, in multilevel modulation schemes the detection SNR requirement grows considerably with the modulation index. For the same BER=$10^{-12}$ the PAM4 modulation will require a SNR on the order of 24 dB, while for PAM8, a SNR of approximately 30 dB will be necessary. With more stringent SNR requirements the majority of existing AFE and DFE implementations, originally formulated for two-level signaling, would no longer be adequate or may result in excessive power dissipation. Therefore, development of enhanced linearity, low power and low supply voltage receiver elements such as AFE and mixed signal DFE capable of operating with multilevel modulation schemes will be highly desirable.

SUMMARY

In some embodiments, a decision feedback equalizer (DFE) is provided. The DFE includes an analog front end, configured to receive a digital communication signal having amplitude modulation greater than two-level, and to output a feedforward signal based on the digital communication signal. The DFE includes a summing block, configured to receive the feedforward signal, a plurality of delayed data decisions as digital signals, and a plurality of adapted coefficients. The summing block is configured to produce an analog feedback signal as an analog subtraction from the feedforward signal of each of the plurality of delayed data decisions multiplied by a corresponding one of the plurality of adapted coefficients. The DFE includes a delay chain configured to produce the plurality of delayed data decisions based on the analog feedback signal, each of the plurality of delayed data decisions having two or more bits, corresponding to the amplitude modulation being greater than two-level. A method for decision feedback equalization is also provided.

Other aspects and advantages of the embodiments will become apparent from the following detailed description taken in conjunction with the accompanying drawings which illustrate, by way of example, the principles of the described embodiments.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

An apparatus and related method of mixed signal Full-Bridge DFE (FBDFE) with enhanced performance capable of operation with multilevel signal modulation at relatively low power consumption and supply voltage requirements are disclosed herein. The present FBDFE has complementary and balanced circuit structures that exhibit reduced distortion at low supply even without the necessity of negative feedback, thus allowing for lower power. The FBDFE has an input signal stage, whose output is coupled into a summing node with decision feedback. The decision feedback has a plurality of tap weight (coefficient) amplifiers and data decision DACs (digital to analog converters), whereby coefficient values are obtained by adaptation to the specific channel, thus compensating post-cursor ISI (intersymbol interference).

Figure 3:
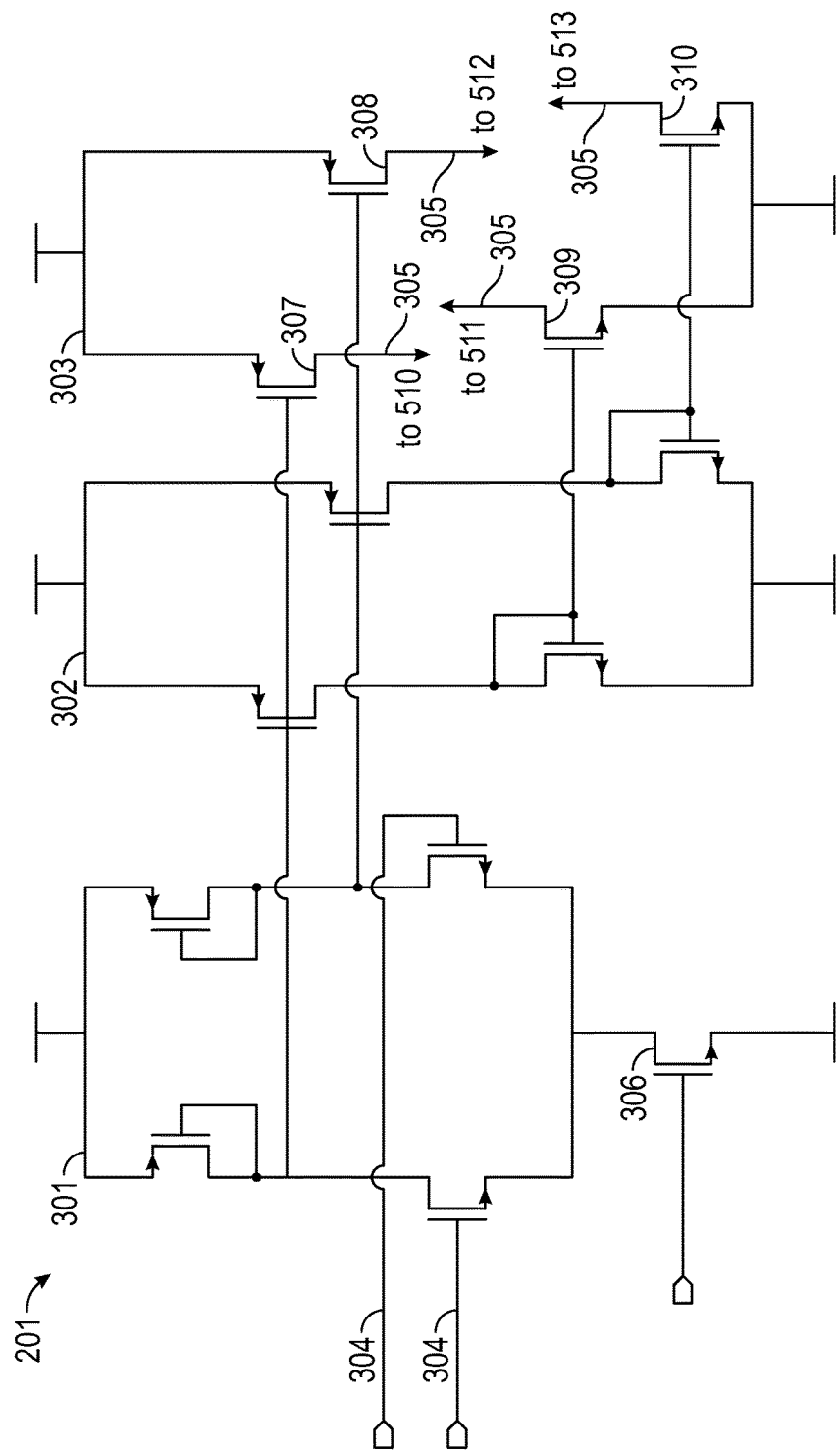
FIG. 3 is a schematic of input amplifiers suitable for use in the DFE of FIG. 1.
Figure 4:
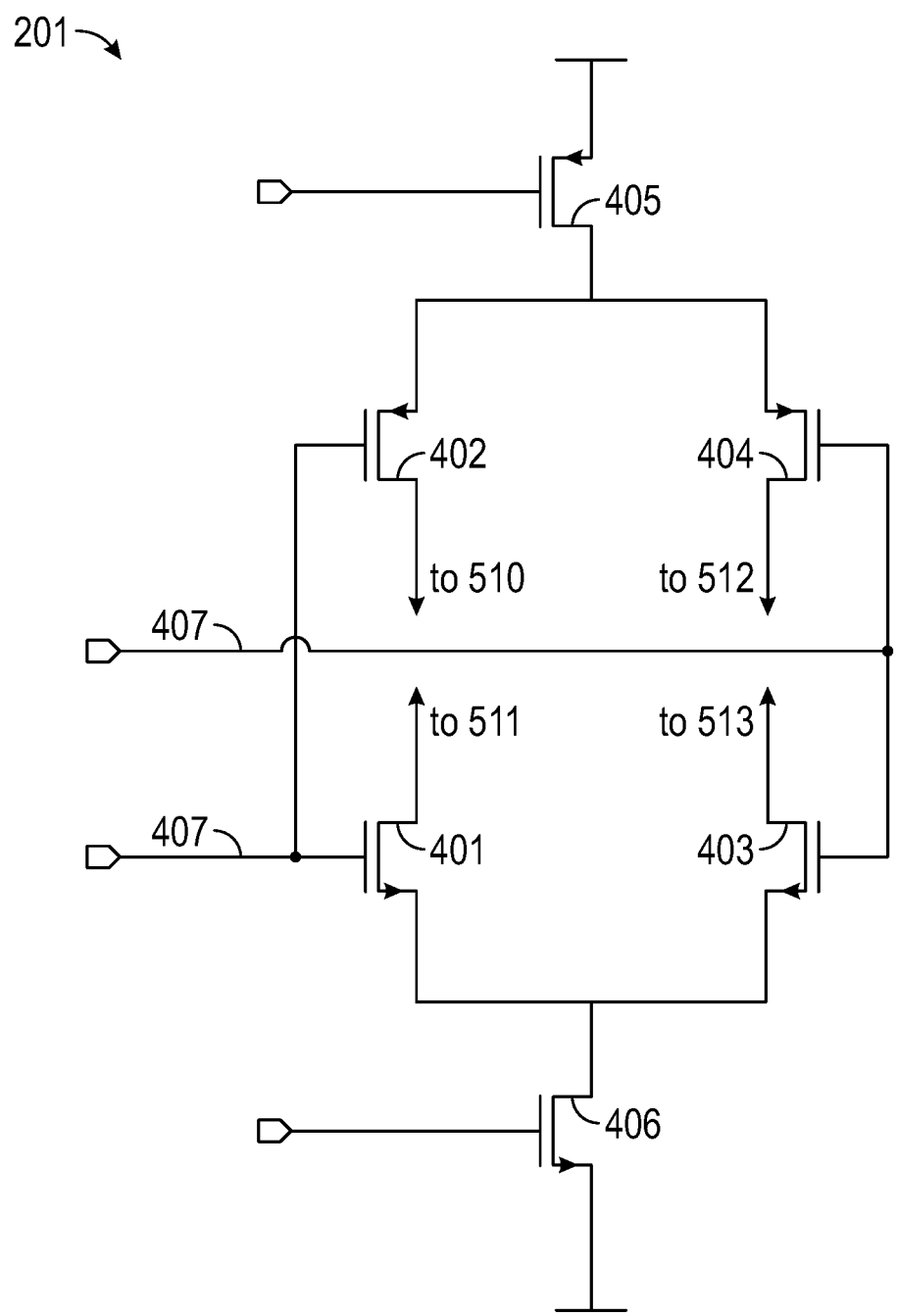
FIG. 4 is a schematic of a feedback tap amplifier with a DAC (digital to analog converter), suitable for use in the DFE of FIG. 1
Figure 5:
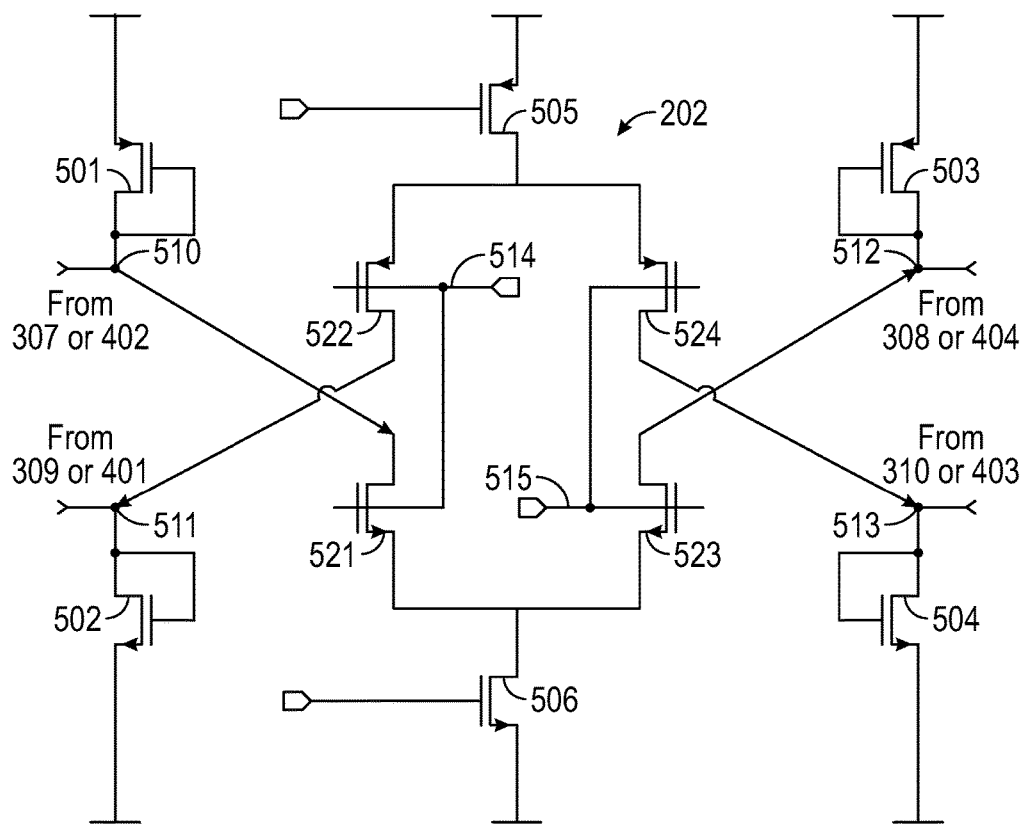
FIG. 5 is a schematic of an output amplifier suitable for use in the DFE of FIG. 1.

Two embodiments of the FBDFE are as follows. One embodiment is particularly formulated for low voltage operation and the other is suitable for higher operating speed. In the first embodiment the FBDFE is comprised of the input stage, and the low-power summing stage, whereby the decision feedback filter taps are summed up, followed by the power amplifier output stage, which is capable of producing sufficiently large swing at the detector input. The output and summing stages are implemented as a pseudo-differential topology based on a current-mode circuit arrangement. Depending on the AFE signal format being current mode or voltage mode, the input stage is implemented respectively: (i) with pseudo-differential complimentary current-mode inputs or (ii) with voltage input based on a differential complementary structure. The key advantage of this embodiment is that the feedback filter tap summation could be performed at relatively low DAC output current, making it possible to operate at low voltage and enhanced signal linearity at the same time. Circuits suitable for a low-voltage embodiment are shown in FIGS. 3-5.

Figure 6:
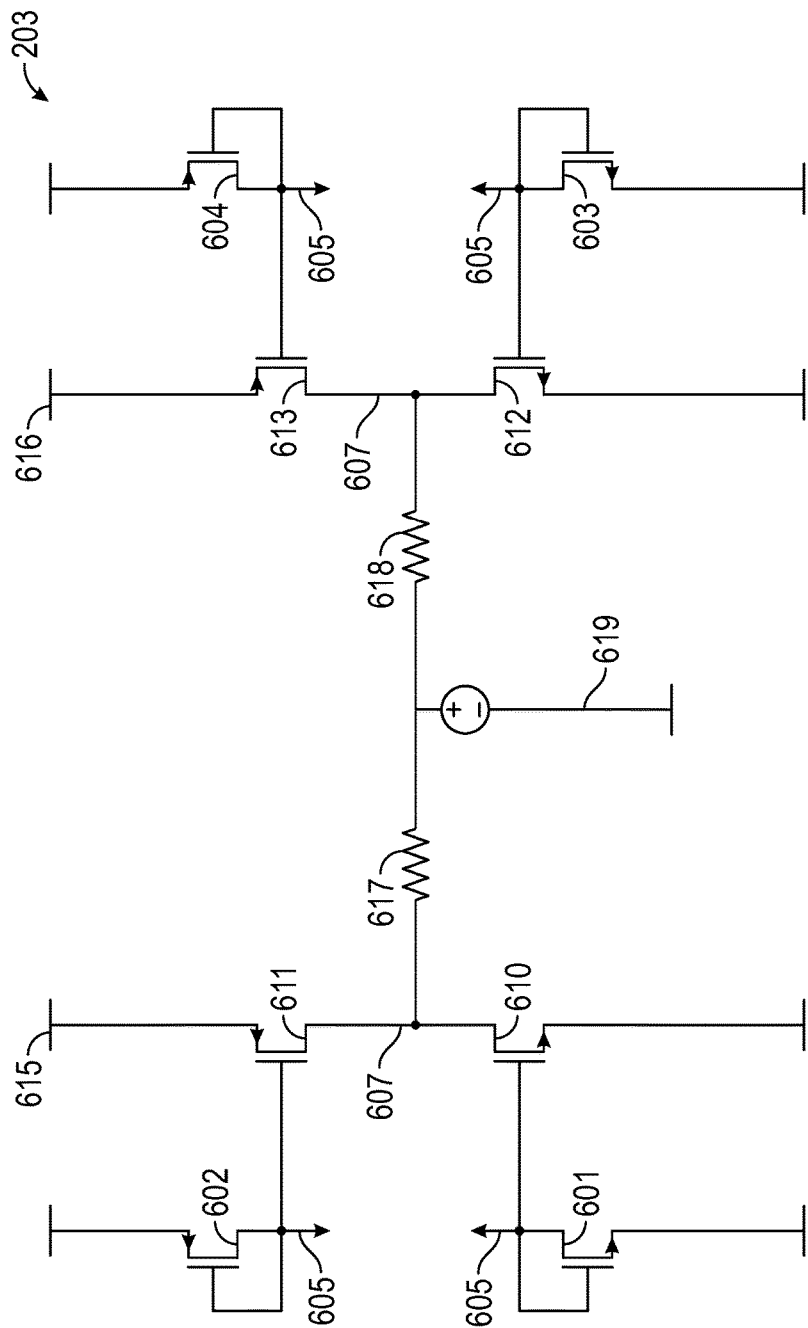
FIG. 6 is a schematic of a high speed FBDFE summing block, suitable for use in the DFE of FIG. 1.
Figure 7:
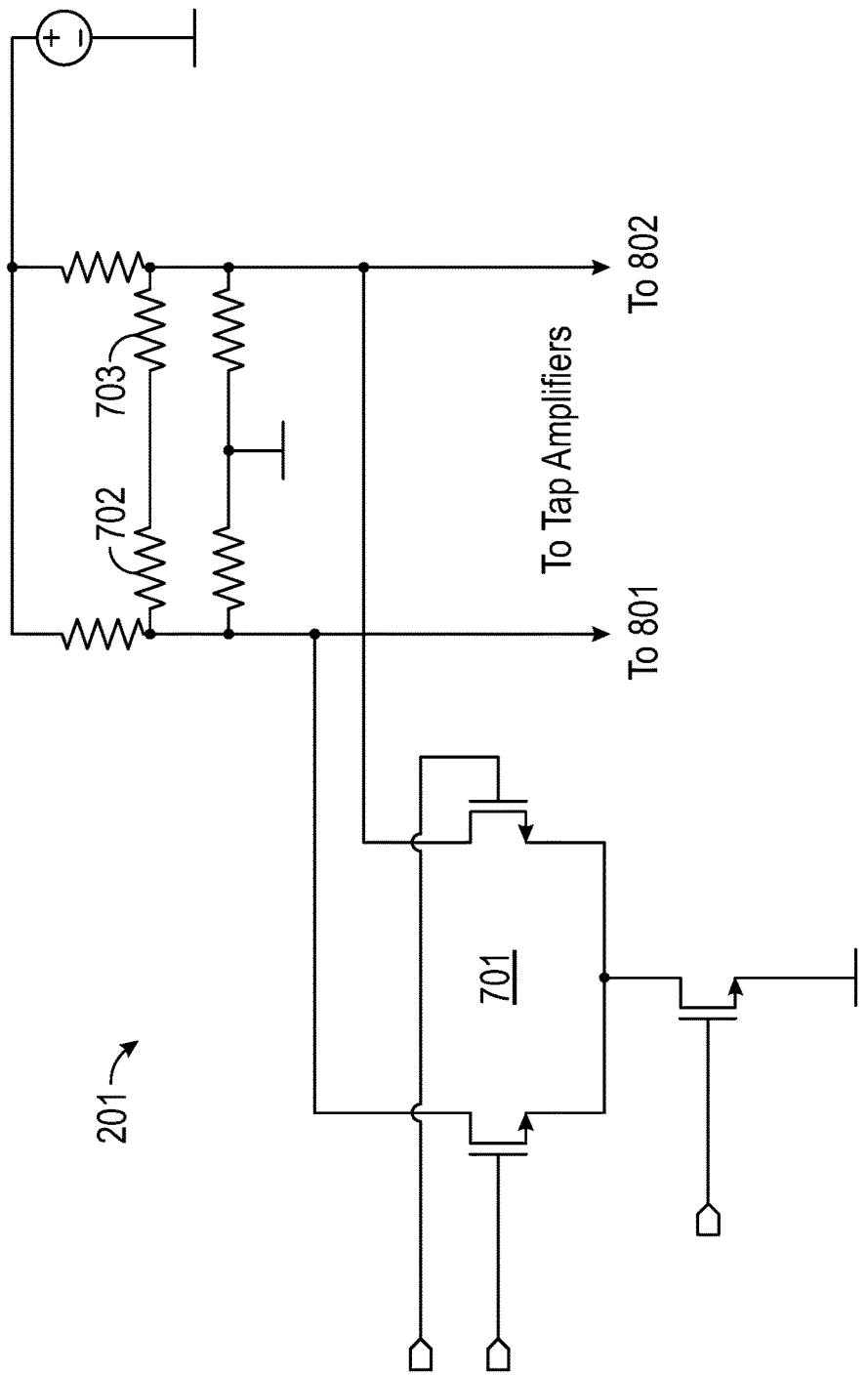
FIG. 7 is a schematic of an input analog signal amplifier suitable for use in the DFE of FIG. 1.
Figure 8:
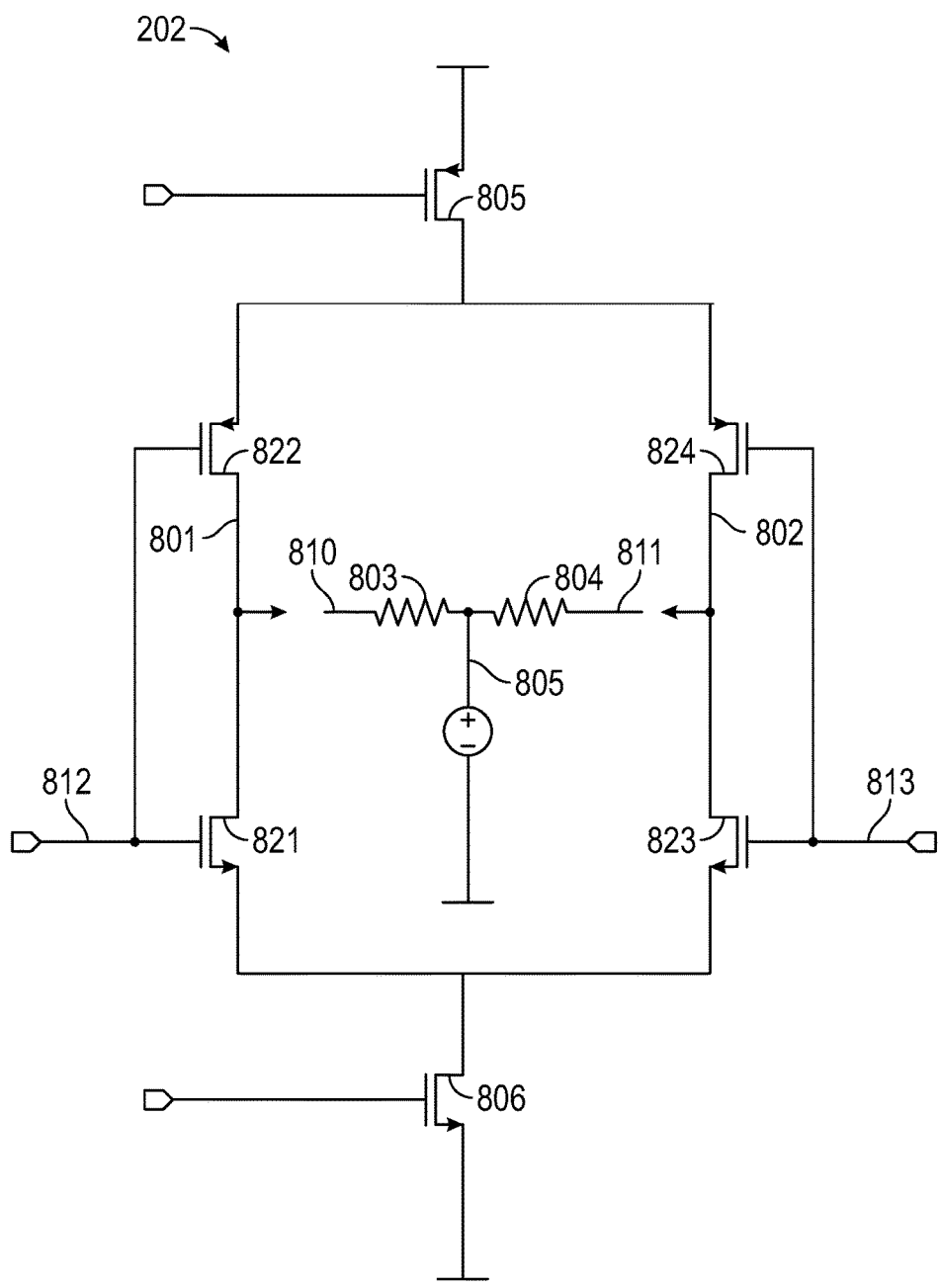
FIG. 8 is a schematic of a feedback tap (coefficient) amplifier suitable for use in the DFE of FIG. 1.

In another embodiment particularly suited for high speed operation the summing node is immediately coupled into the comparator (slicer) input, with the comparator serving as the decision detector. Circuits suitable for a high-speed embodiment are shown in FIGS. 6-8.

The main advantages of various embodiments of the full-bridge tap amplifier compared to the conventional method are as follows: (i) the operating supply current is roughly half of that required by the conventional DFE for the same differential current, and (ii) the resulting linearity is considerably better due to the complementary push-pull circuit topology.

The high-speed embodiment is primarily intended for PAM4 signaling, whereas the low-voltage embodiment would be more beneficial for higher-modulation indices such as PAM8 and above, whereby the speed requirements are naturally more relaxed, however at the cost of enhanced linearity.

Both embodiments provide a method of automatic control of common mode independent of coefficient values and constant over the adaptation cycle. It is important to keep the comparator in the optimal common mode operation range and eliminate unwanted sensitivity dependency on coefficient variations. In the first embodiment this is achieved by the fact that the output buffer is decoupled from the summation node and hence insensitive to the sum of currents on this node. In the second embodiment the common mode does not change during the adaptation because of symmetry of currents through each push-pull tap.

Present embodiments address the key requirements for high speed low power, low supply voltage multilevel data transceivers.

Figure 1:
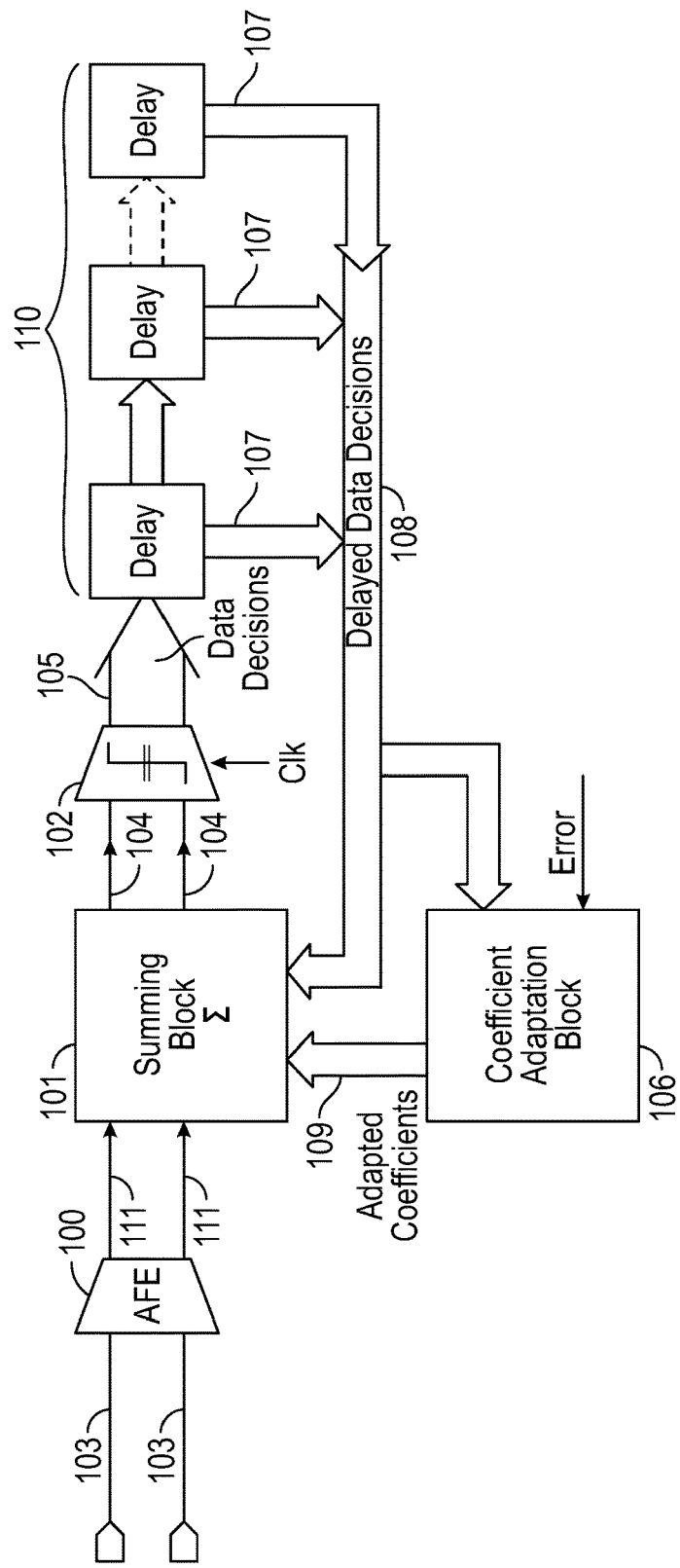
FIG. 1 is a block diagram of a mixed-signal DFE (decision feedback equalizer) with a generalized AFE (analog frontend), in accordance with an embodiment of the present disclosure.

FIG. 1 shows a generalized block diagram of a mixed-signal DFE with AFE interface, in accordance with an embodiment of the present disclosure. The DFE architecture shown on FIG. 1 is a full-rate direct architecture. The embodiment shown is not limited by a specific architecture, and can be used with a variety of DFE structures such as full rate, half rate, or look-ahead, and with different modulation indexes. The AFE 100 could contain amplitude control, filtering, offset cancellation and so on. The AFE output signal 111 could be in the voltage or current domain or a combination of both, and comprises the feedforward path coupled to the summing block 101. The AFE input signal 103 could be in the voltage or current domain or a combination of both, and is a digital communication signal having amplitude modulation of greater than two levels (e.g., PAM4, PAM8, PAM 16). In general the DFE function in receivers is data recovery from a signal distorted in a communication channel by inter-symbol interference (ISI) and noise. The summing block 101 removes the post-cursor ISI by subtracting from the summing block 101 input signal (e.g., the AFE output signal 111) the processed delayed data decisions obtained from the tapped delay line 110. The data decisions 105 are generated by a clocked comparator (slicer) 102 coupled into the output of the summing block 101. The output of comparator 102 (e.g., each of the data decisions 105) is coupled into the delay line 110, which is also clocked at the symbol rate. The delay line 110 can be implemented, for example, as a delay chain having a series of clocked flip-flops, with a bit width of the delay chain corresponding to the number of levels of modulation in the signaling (e.g., two bits for PAM4, three bits for PAM8, four bits for PAM16 etc.). The delay line tap outputs 107, carrying the delayed data decisions 108, are coupled into the summing block 101. The tap weight coefficients, i.e., the adapted coefficients 109, generated by the adaptation block 106 are also coupled into the summing block 101. Hence, the summing block produces the feedback signal 104 by multiplying the adapted coefficients 109 with the corresponding tap decisions, i.e., the delayed data decisions 108, and subtracting the result from the feedforward path (e.g., from the AFE output 111). With properly adapted coefficients the feedback signal 104 represents an exact post-cursor ISI replica. The DFE length (the number of coefficients) is dependent upon the specific channel complexity, system SNR and power requirements. The coefficients could be adapted using any known adaptation algorithm, for example, the Least-Mean-Squares (LMS), among others.

Figure 2:
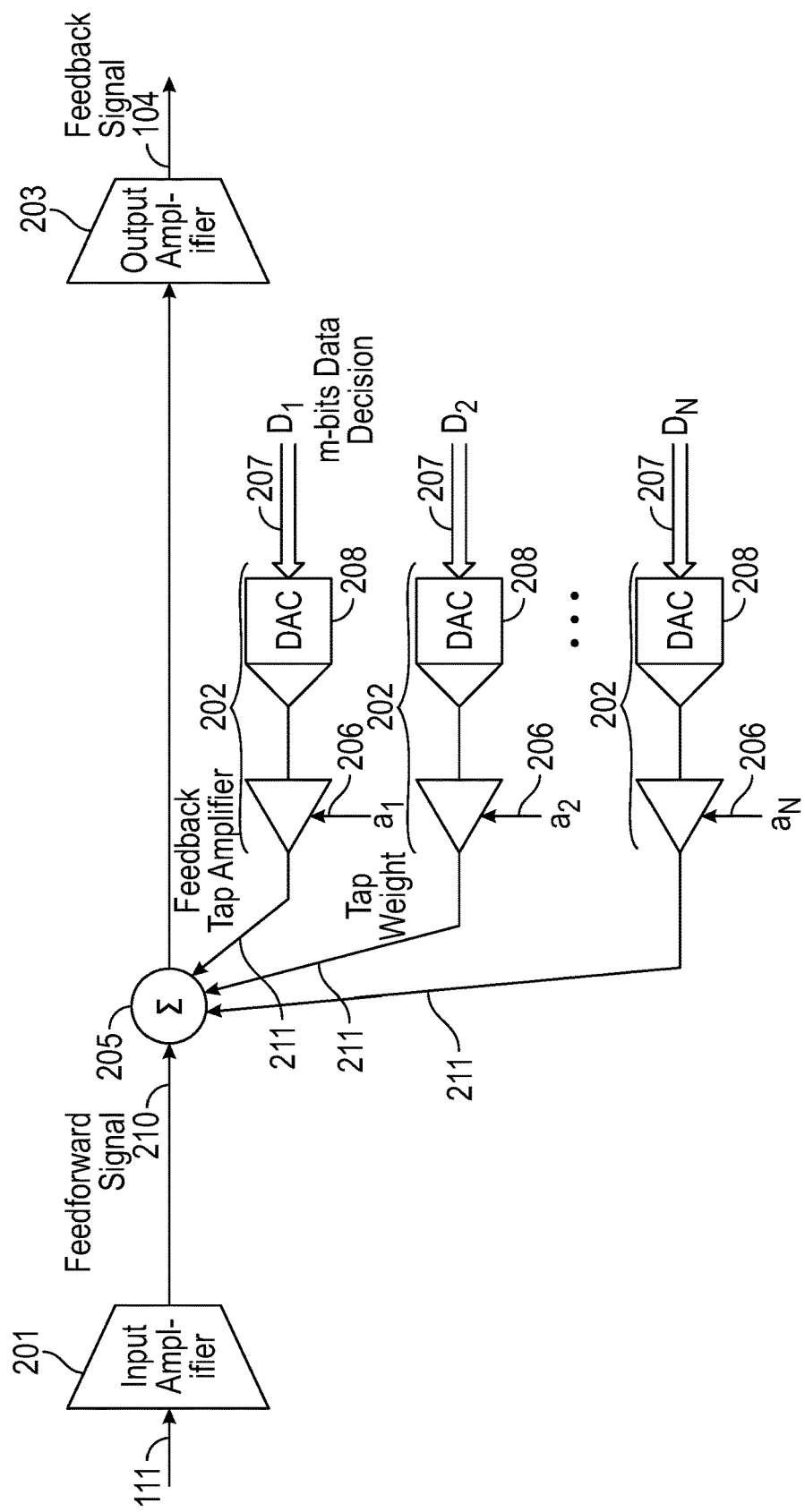
FIG. 2 is a schematic of a low-voltage FBDFE (full bridge DFE) summing block, suitable for use in the DFE of FIG. 1.

FIG. 2 shows the first embodiment of the summing block 101 of FIG. 1, as suitable for low voltage applications. This embodiment includes the input amplifier 201, feedback tap amplifiers 202 and output amplifier 203. The outputs 211 of feedback tap amplifiers 202 are coupled into the summing node 205 and summed with the feedforward signal 210. The tap amplifiers adapted coefficients inputs 206 take N analog or digital signals from the adaptation block 106 (of FIG. 1), whereby N is equal to the total number of DFE taps. The data decision inputs 207, also having the dimension of N, feed the delayed data decisions 108 into the tap amplifiers 202 from the feedback delay line 110 (see FIG. 1). Each data decision input 207 inputs an m bit wide delayed data decision 108 from a corresponding one of the delay line tap outputs 107. In the embodiment shown in FIG. 2, each feedback tap amplifier 202 includes a DAC 208 and an amplifier with digital gain control. Further embodiments include multipliers, various types of amplifiers, and digital to analog conversion, which may be integrated with the multipliers and amplifiers in various combinations. In the case of low supply voltage, it is difficult to achieve a sufficiently large swing immediately at the summing node 205, which in some embodiments also serves as a comparator 102 input. The output amplifier 203 is used to generate the required signal swing at the comparator 102 input to produce proper decisions and, therefore, improves the dynamic range and SNR. Bit widths of each of the delayed data decisions 108 and the delay line tap outputs 107 equals the bit width of the delay chain, corresponding to the number of levels of modulation as above.

FIG. 3(a) shows one example of implementation of the input amplifier 201 of FIG. 2 for the first embodiment. Functionally this is the trans-conductance amplifier with differential voltage input 304 and quad fully balanced current output 305 suitable for full bridge signaling. As understood from FIG. 1 and FIG. 2, the AFE output 111 connects to the differential voltage input 304 of the input amplifier 201. This example assumes voltage mode differential signaling in the AFE 100. If an embodiment of the AFE 100 utilizes fully balanced current mode signaling, the AFE output 111 can be fed to the summing node 205 directly, without an intervening amplifier (e.g., without the input amplifier 201). In this example the signal is originally fed to the circuit from a CML (Current Mode Logic) stage (NMOS in this embodiment). The CML stage 301 shown on FIG. 3(a) can be configured as a programmable gain amplifier (PGA) control stage or an amplifier with AGC (automatic gain control), since the current source (e.g., NMOS transistor 306) of this stage controls the analog input current amplitude and, finally, the current amplitude at the summing node 205 and the voltage swing at the comparator 102 input. The mirror stage 302, and the output stage 303 that follows the mirror stage 302, translate the input voltage signals, at the differential voltage input 304, into two complimentary differential pairs of current outputs, i.e., the quad fully balanced current output 305. The quad fully balanced current output 305 is connected to the summing node 205, i.e., transistors 307, 308, 309, 310 are connected to nodes 510, 511, 512, 513 as will be further explained with reference to FIG. 5.

FIG. 4 shows another embodiment of the input transconductance amplifier 201. This embodiment assumes that common mode of the input signal at the differential input 407 (e.g., the output 111 of the AFE 100) is approximately in the middle of the supply. The signal amplitude as well as the bias current should be chosen such the transistors 401, 402, 403, 404, 405, 406 are in saturation mode. The tail currents should be generated from the reference current by the replica DAC, to ensure that equal currents flow through NMOS 406 and PMOS 405 transistors. The amount of current finally defines the signal amplitude at the summing node 205 (e.g., at the nodes 510, 511, 512, 513, to which the transistors 401, 402, 403, 404 are coupled).

FIG. 5 shows the structure of the tap amplifier 202, in one embodiment. The summing node 205 of FIG. 2 is realized in four nodes 510, 511, 512, 513 for quadrature differential signaling corresponding to a full bridge structure. Therefore, nodes 510, 511, 512, 513 (as summing node 205) receive signals from a plurality of tap amplifiers 202, while only one of the tap amplifiers 202 (e.g., transistors 505, 522, 524, 521, 523, 506) is shown on FIG. 5. In other words, a plurality of tap amplifiers 202 couple respective transistors 524 to node 513 with a single instantiation of the load transistor 504. A plurality of tap amplifiers 202 couple respective transistors 523 to node 512 with a single instantiation of the load transistor 503. A plurality of tap amplifiers 202 couple respective transistors 522 to node 511 with a single instantiation of the load transistor 502. A plurality of tap amplifiers 202 couple respective transistors 521 to node 510 with a single instantiation of the load transistor 501. Whereas the tap gain is set by the respective coefficient, the tap amplifier driving capability can be adjusted accordingly to save power. Typically, smaller coefficients would require less driving capability, and hence, less power consumption. In various implementations, all tap amplifiers 202 can be equal to each other in size, or scaled based on the fact that taps with higher number (i.e., later in the delay chain) supply less current to the summing node 205 for most real channels. Diode connected transistors 501, 502, 503, 504 serve as a load for the current summation at the summing node 205. The nodes 514 and 515 are inputs of the data decision feedback and receive the m bits of the delayed data decision. This is a rail-to-rail digital signal, therefore complementary pairs of NMOS/PMOS transistors 521/522 and 523/524 are operated in switch mode. The arrows on nodes 510 and 513 show the direction of current during one bit cycle when the signal on node 514 is high while the complementary signal on 515 is low. The tap amplifier 202 produces multiplication of the adapted coefficient 109, from the coefficient adaptation block 106, and the digital signal from delayed data decisions 108 at nodes 514, 515, for further subtraction from the input signal at summing nodes 510, 511, 512, 513, i.e., at the summing node 205. The coefficient is represented by analog currents forced by current sources implemented through the transistors 505 and 506. Similarly to the case of the input amplifier 201 of FIG. 4, those currents are generated by replicas (e.g., current mirrors or other current generating circuitry) that guarantee the same current for both NMOS transistor 506 and PMOS transistor 505. A value of current is generated by a current DAC based on a present value of a coefficient generated by the coefficient adaptation block 106.

FIG. 6 shows an example of the output amplifier 203 of the first embodiment of the FBDFE, for low-voltage operation. Functionally this is a trans-impedance amplifier (TIA) with quadrature complimentary differential current input 605 and differential voltage output 607. The output amplifier 203 includes current amplifier stages 615, 616 and termination resistor 617, 618. In FIG. 6, the four complementary loads implemented with diode connected transistors 601, 602, 603, 604 are shown. The voltages at the summing nodes, i.e. at the gates of the transistors 610, 611, 612, 613, are coupled into the input 605 of the output amplifier 203, whose two stages 615 and 616 are arranged as a push-pull pseudo-differential structure. The instant currents driven through the stages 615 and 616 are proportional to the currents through the diode loads 601, 602, 603, 604 with a factor of a given mirror ratio. The currents are further terminated on the differentially connected resistive load 617, 618 and converted into voltage coupled to the comparator 102 input, as the feedback signal 104. Common mode level source 619 could be set independently in the range of the comparator best sensitivity. For embodiments of the comparator 102 having current-mode input, the current-to-voltage conversion is not required, and signal power amplification is performed by the comparator 102.

The overall output signal linearity will depend on the device AC to DC bias currents ratio. The difference between the DC bias currents should be higher than the AC current amplitude to keep linear operation of the circuits. Therefore, higher linearity could be achieved at the cost of power in some embodiments.

The second embodiment of the proposed invention is mainly intended for high speed operation and may require higher voltage supply. For high speed applications, it is important to keep the total feedback loop delay for the first DFE tap as small as possible, therefore the output amplifier 203 of the FIG. 2 stage is eliminated, and the output signal, feedback signal 104, is taken directly from the summing node 205 and coupled to the comparator 102 input.

FIG. 7 shows a further embodiment of an input analog signal amplifier 201, which is represented by the CML stage 701 loaded on the resistive load 702, 703 that is shared with all the tap amplifiers 202 of the embodiment. Outputs of the CML stage 701 connect to the summing node 205, e.g. to nodes 801, 802 of the tap amplifiers 202 of FIG. 8 according to the second embodiment (e.g., high-speed) of the present disclosure. Alternatively or additionally to the resistance, the total load could include a diode-configured transistor, a current source or a combination of thereof. All three types of load could be represented by a plurality of parallel branches.

Depending on supply and common mode voltage requirements or other considerations, some of the center taps of the parallel branches could be coupled to a given potential, left floating or coupled to the ground. Similarly, the input device arrangement is not limited to a differential pair of NMOS transistors, but could be replaced, for example, by complimentary NMOS-PMOS pairs, or a solely PMOS pair depending on a particular supply or other conditions. Furthermore, all stages can be converted into a PMOS CML configuration if the input common mode level is closer to ground and hence, more favorable for PMOS CML circuit operation. Higher linearity of the input amplifier is achieved by a higher current density of the input devices, which is in a tradeoff relation between power and mismatch requirements. Therefore, reduction of power consumption through the tap amplifier 202, for the same amount of differential current, is highly desirable.

FIG. 8 shows the structure of the tap amplifier 202 according to the second embodiment (e.g., high-speed) of the present disclosure. Only one tap amplifier 202 of the set is shown for simplicity. Similarly to the first embodiment, the device sizes for each tap can be the same or scaled corresponding with the respective coefficient and based on the fact that taps with higher index would require delivering less current into the summing node for a realistic channel Output nodes 801 and 802 are coupled to the load 803, 804 shared with other tap amplifiers 202 and the input amplifier 201 (e.g., see FIG. 7). Similarly to the discussion of the previous paragraph, the load 803, 804 is not limited to the resistive device. The tap amplifier 202 and DAC effectively perform multiplication of the adapted coefficient represented by the current magnitude of the current sources, i.e., transistors 805 and 806, and the digital signal from the delayed data decision, whereby the delay corresponds to the tap index, further subtracting the sum from the feedforward input signal at the summing nodes 810, 811. Similarly to the case of the input amplifier of FIG. 4, the currents are generated by the replica (e.g., a current mirror or other matching current generating circuit) ensuring equal amount of current for both NMOS transistor 806 and PMOS transistor 805 tail devices. The tap current magnitude is controlled proportionally by the respective coefficient generated in the coefficient adaptation block 106. The nodes 812 and 813, for the sake of simplicity as in the binary case (e.g., data decisions having two bits for PAM4), are the inputs for the data decision feedback. In case of higher modulation (e.g., PAM8, PAM16 or above), more currents and more complex DAC function would be required to decode the multi-bit decision into the corresponding tap. Notice that the supply current consumed by the push-pull tap amplifier (i.e., the tap amplifier 202 shown in FIG. 8) for the same amount of differential current is two times less than required by the conventional topology. This is because in a push-pull stage the current is forced to the load differentially in each cycle and voltage is applied between differential "plus" and "minus", unlike "plus" and AC ground or "minus" and AC ground like in a conventional uni-polar configuration. This, for example, for a DFE gain equal to 2, allows up to 30% of power savings. Another important feature of the disclosed scheme is the insensitivity of the tap amplifier output common mode level to the current magnitude or, in other words, to the adaptation coefficient. This is due to the fact that equal amount of currents are flowing through the "source" and "sink" with the common mode level completely defined by the mid-node potential 805. This property also makes push-pull topology attractive for high speed DFE applications.

Figure 9A:
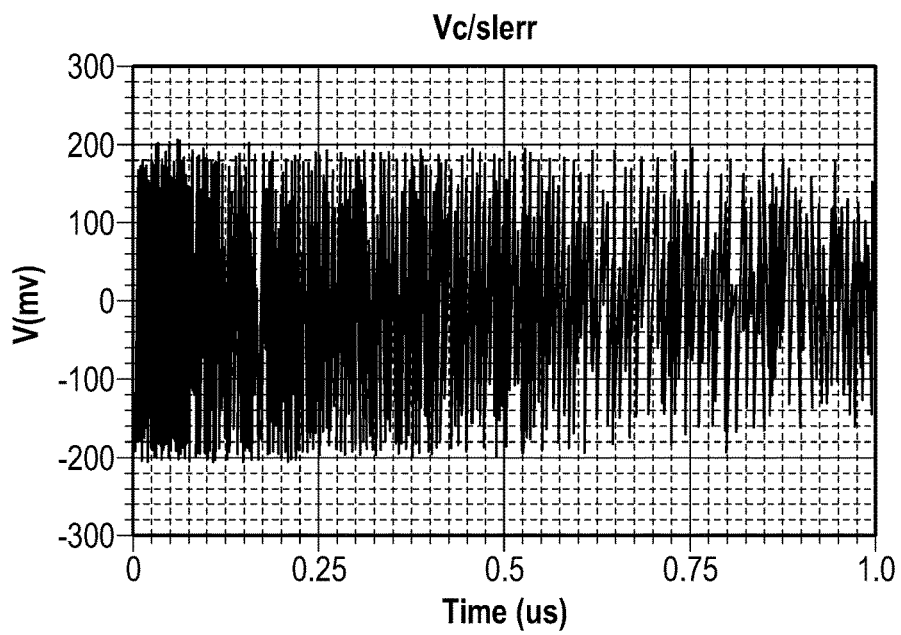
FIG. 9a and FIG. 9b are a graph of a simulated convergence process for an error signal for a conventional tap amplifier structure and for an embodiment of a tap amplifier in accordance with the present disclosure.
Figure 9B:
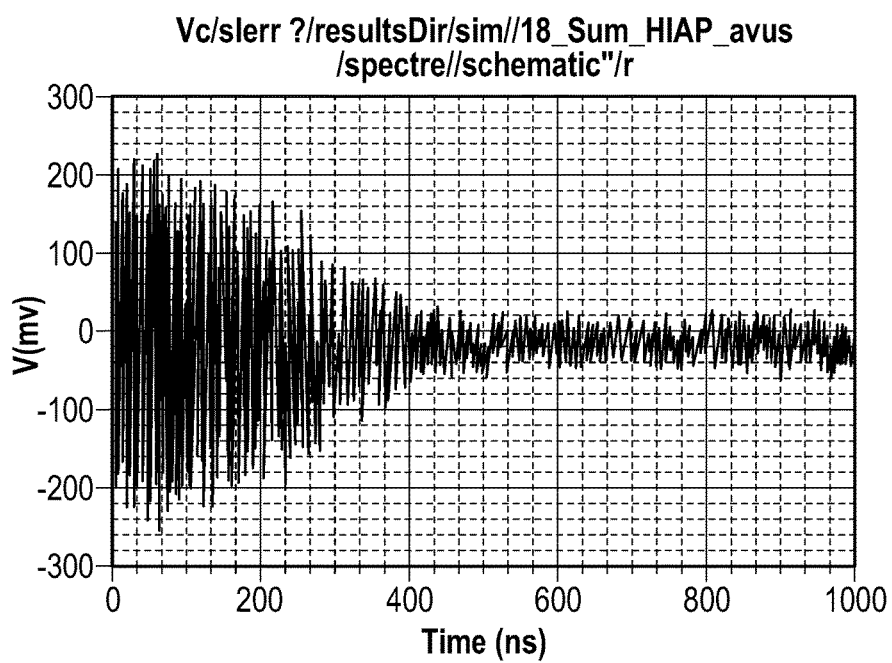

FIG. 9 shows a simulated convergence process for an error signal for a conventional tap amplifier structure (a) and for an embodiment of a tap amplifier (b) in accordance with the present disclosure. As one can observe in this simulation, with full-bridge tap amplifier structures such as shown in FIG. 4 or FIG. 8, superior convergence and SNR is achieved.

Figure 10:
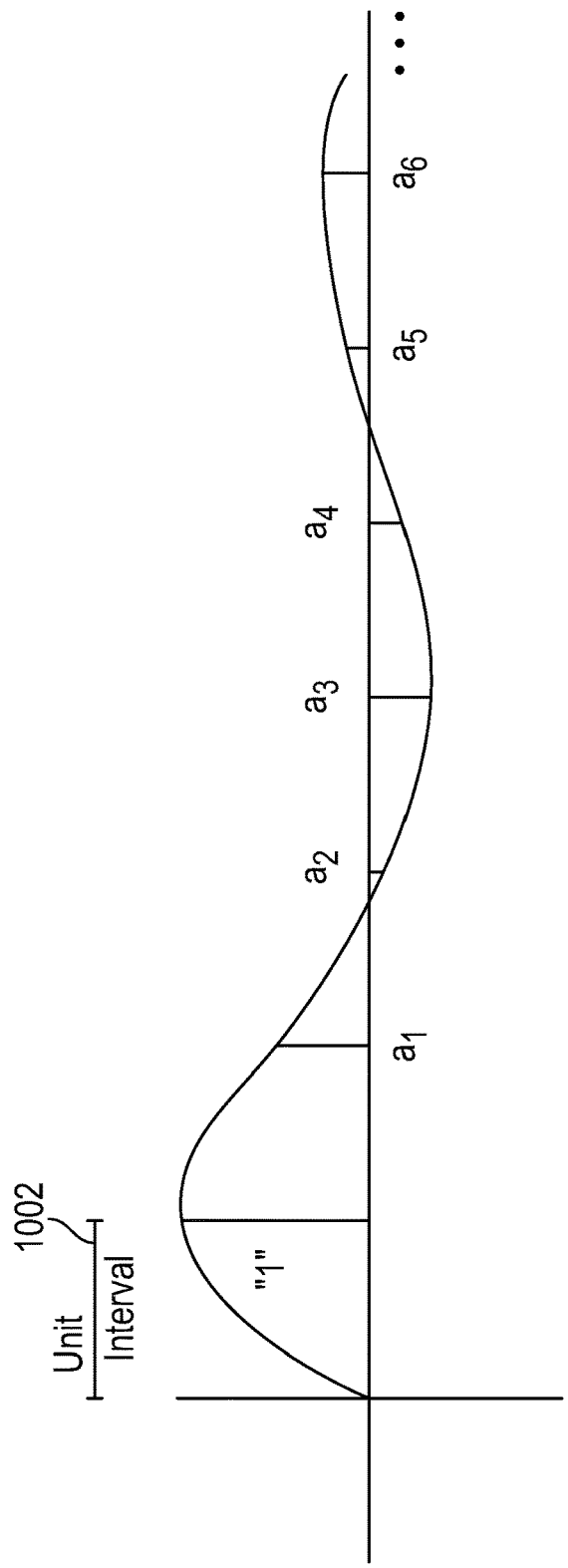
FIG. 10 is a waveform diagram, showing communication of a digital "1", with signal distortion.

FIG. 10 is a waveform diagram, showing communication of a digital "1", with signal distortion. This depiction of a communication waveform is presented for the purpose of discussion of signal processing relative to present embodiments, and in no way limits communication waveforms as received by embodiments of this or other DFEs. In this example, a transmitter sends a digital "1", with a nominal pulse amplitude according to a selected multilevel modulation scheme, e.g. PAM4 or PAM8. The pulse width is one unit interval 1002, according to the symbol rate of the modulation scheme. As a result of the time and distance over which the pulse travels, and the communication media (e.g., wire, wireless, optical), the pulse distorts as shown Amplitudes a1, a2, a3, a4, a5, a6 can be measured at multiples of a unit interval 1002 from the original pulse. These amplitudes a1, a2, a3, a4, a5, a6 are characteristic not only of the distortion of a single pulse, but of distortion of successive pulses in a communication waveform having data expressed as levels in the multilevel modulation scheme. Conceptually, subtracting each of these amplitudes a1, a2, a3, a4, a5, a6 from the waveform depicted in FIG. 10 would result in reconstruction of just the initial digital "1" pulse, with all of the distortion removed. This is precisely what DFEs accomplish. In principle, by compensating for the longtail distortion caused by each successive pulse, the originally transmitted waveform and the data carried by the communication waveform can be reconstructed. In practice, the DFE generates the data as the "data decision", i.e., generates the sequence of data bits transmitted, as the sequence of data decisions.

Programmability can also be added to the proposed architecture, in further embodiments. The programmability can be applied, for example, as follows. In various embodiments, power could be reduced. For example, when the communication channel is short (and distortion is generally lower), a group of coefficients with small values could be completely powered down based on a programmable threshold. This could be implemented as a programmable register coupled to logic or power supply controls for circuitry relating to these coefficients. In the case of a geometrically confined reflection, the position of a group of coefficients could be programmed at the specific location (e.g., with a sliding window), matching the reflection, and the rest of the coefficients could be powered down as above.

In various embodiments, overall system performance could be selected based on a specified or predetermined Signal to Noise Margin—for example, by constraining Equalization e.g. via fixing some DFE coefficients to a pre-set value to avoid excessive high-frequency boost. In a related matter, system performance could be selected according to a specified Standard or specified Protocol, to meet specific standard performance and/or functional requirements as necessary. The above examples embody various programmability applications, and it is understood that this maybe thought of in a broader sense and not limited by the examples alone.

Figure 11:
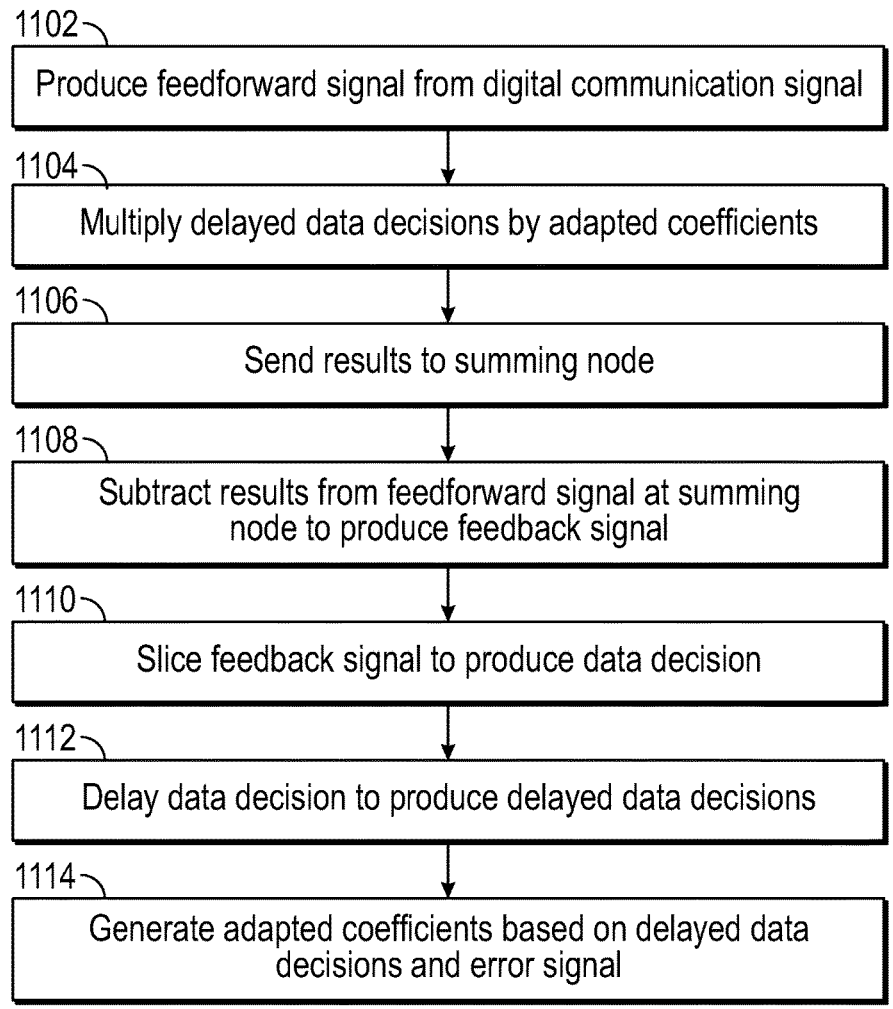
FIG. 11 is a flow diagram, showing a method of decision feedback equalization, which can be practiced on embodiments of the DFE disclosed herein.

FIG. 11 is a flow diagram, showing a method of decision feedback equalization, which can be practiced on embodiments of the DFE disclosed herein. Examples of DFE components that can implement actions of the method are given below.

A feedforward signal is produced from a digital communication signal, in an action 1102. For example, the digital communication signal could have amplitude modulation of at least four levels, corresponding to two bits per symbol or per unit interval in the communication waveform. An analog front-end could produce the feedforward signal. The feedforward signal is presented to a summing node of a mixed signal summing block. In some embodiments, the feedforward signal is presented as two complementary differential pairs of current outputs.

Delayed data decisions are multiplied by adapted coefficients, in an action 1104. The adapted coefficients could be produced from the delayed data decisions, by a coefficient adaptation block, and could be analog or digital signals.

Results of the multiplication are sent to the summing node, in an action 1106. For example, the results of the multiplication could be in the form of analog currents, e.g., two complementary differential pairs of currents for compatibility with the feedforward signal at the summing node.

The results of the multiplication are subtracted from the feedforward signal at the summing node, to produce a feedback signal, in an action 1108. For example, positive currents can be offset by negative currents, at each of multiple nodes, in the summing node.

The feedback signal is sliced to produce a data decision, in an action 1110. For example, a clocked slicer, which is a type of comparator or analog to digital converter, can be applied to slice the feedback signal according to amplitude, producing a multibit data decision representing the value of a number of bits according to the pulse amplitude in the communication signal.

The data decision is delayed, to produce the delayed data decisions, in an action 1112. For example, a delay chain having clocked flip-flops can be applied to the data decision, and outputs in between pairs of flip-flops can produce the delayed data decisions at delay taps.

Adapted coefficients, based on the delayed data decisions and the error signal of FIG. 1, are generated in an action 1114. For example, a coefficient adaptation block can produce the adapted coefficients. The adapted coefficients pertain to how much amplitude should be subtracted from the feedforward signal for a particular data decision at a particular unit interval, and the data decisions then determine when a particular adapted coefficient is applied at the summing block.

Detailed illustrative embodiments are disclosed herein. However, specific functional details disclosed herein are merely representative for purposes of describing embodiments. Embodiments may, however, be embodied in many alternate forms and should not be construed as limited to only the embodiments set forth herein. For example, although the main objective is multi-level modulation, the DFE could also operate with two-level (PAM2) if necessary in some embodiments.

It should be understood that although the terms first, second, etc. may be used herein to describe various steps or calculations, these steps or calculations should not be limited by these terms. These terms are only used to distinguish one step or calculation from another. For example, a first calculation could be termed a second calculation, and, similarly, a second step could be termed a first step, without departing from the scope of this disclosure. As used herein, the term "and/or" and the "/" symbol includes any and all combinations of one or more of the associated listed items.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

With the above embodiments in mind, it should be understood that the embodiments might employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing. Any of the operations described herein that form part of the embodiments are useful machine operations. The embodiments also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" perform a task or tasks. In such contexts, the phrase "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. 112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A decision feedback equalizer (DFE) circuit, comprising:
    an analog summing node that subtracts weighted analog versions of delayed data decisions from a digital communication signal of multiple level amplitude modulation or from a feedforward signal based on the digital communication signal, to produce a feedback signal;
    a plurality of digital to analog converters that convert each of the delayed data decisions from digital signals of two or more bits, corresponding to the multiple level amplitude modulation, to analog versions; and
    analog or mixed analog-digital circuitry that multiplies the analog versions of the delayed data decisions by corresponding adapted coefficients to produce the weighted analog versions of the delayed data decisions.

2. The decision feedback equalizer circuit of claim 1, wherein the analog or mixed analog-digital circuitry that multiplies comprises a plurality of digital gain controlled amplifiers.

3. The decision feedback equalizer circuit of claim 1, wherein the analog or mixed analog-digital circuitry that multiplies comprises a multiplier.

4. The decision feedback equalizer circuit of claim 1, further comprising:
    a coefficient adaptation block, that adapts coefficients using least-mean-squares (LMS) adaptation to produce the adapted coefficients from the delayed data decisions, wherein the analog summing node is implemented in analog circuitry and the coefficient adaptation block is implemented in analog circuitry, digital circuitry or mixed analog-digital circuitry.

5. The decision feedback equalizer circuit of claim 1, further comprising:
    an input amplifier having as input the digital communication signal of greater than two-level amplitude modulation and having as output the feedforward signal, wherein the feedforward signal is an input to the analog summing node and wherein the analog summing node is limited to subtracting the weighted analog versions of the delayed data decisions from the feedforward signal.

6. The decision feedback equalizer circuit of claim 1, wherein the analog or mixed analog-digital circuitry that multiplies comprises a current mode logic stage configured as a programmable gain amplifier control stage or an amplifier with automatic gain control.

7. The decision feedback equalizer circuit of claim 1, wherein the plurality of digital to analog converters and the analog or mixed analog-digital circuitry that multiplies comprises a plurality of tap amplifiers each having adjustable gain.

8. A decision feedback equalizer (DFE) circuit, comprising:
    an analog front end, configured to receive a digital communication signal having multiple amplitude modulation levels, and configured to output a feedforward signal based on the digital communication signal; and
    a summing block, configured to receive the feedforward signal, a plurality of delayed data decisions as digital signals, and a plurality of adapted coefficients, the summing block configured to produce an analog feedback signal as an analog subtraction from the feedforward signal of each of the plurality of delayed data decisions converted to analog and multiplied, using analog or mixed analog-digital circuitry, by a corresponding one of the plurality of adapted coefficients.

9. The decision feedback equalizer circuit of claim 8, further comprising:
    an output amplifier, included in the summing block, having as input a summing node of the summing block and configured to produce as output a differential voltage as the analog feedback signal; and
    a slicer, having as input the analog feedback signal, and configured to produce as output a data decision, wherein the plurality of delayed data decisions are based on the data decision.

10. The decision feedback equalizer circuit of claim 8, further comprising:
    a slicer, having as input a summing node of the summing block, and configured to produce as output a data decision, wherein the summing node is coupled to the slicer without an intervening amplifier, wherein the summing node provides the analog feedback signal, and wherein the plurality of delayed data decisions are based on the data decision.

11. The decision feedback equalizer circuit of claim 8, further comprising:
    an analog to digital converter (ADC), acting as a slicer, and configured to produce a data decision from the analog feedback signal;
    a delay chain having the data decision as an input; and
    a coefficient adaptation block, configured to receive the plurality of delayed data decisions and configured to produce the plurality of adapted coefficients as digital signals.

12. The decision feedback equalizer circuit of claim 8, further comprising:
    a coefficient adaptation block, configured to produce the plurality of adapted coefficients as analog signals.

13. The decision feedback equalizer circuit of claim 8, further comprising:
    a clocked comparator, acting as a slicer, and configured to produce a data decision from the analog feedback signal.

14. The decision feedback equalizer circuit of claim 8, wherein each of the adapted coefficients is represented by an analog current.

15. A mixed analog-digital circuitry based method for decision feedback equalization, comprising:
    subtracting, at an analog summing node, analog versions of weighted delayed data decisions from a digital communication signal having amplitude modulation of multiple levels or a feedforward signal derived therefrom, to produce an analog feedback signal;

producing, using a delay chain, delayed data decisions from the analog feedback signal; and multiplying, using analog or mixed analog-digital circuitry, an analog version of each of the delayed data decisions by a corresponding adapted coefficient to produce the weighted delayed data decisions.

16. The method of claim 15, further comprising:
converting each of the delayed data decisions from digital form, having the two or more bits, to analog form.

17. The method of claim 15, further comprising:
slicing the analog feedback signal, using a sampled comparator, to produce each data decision, wherein the delay chain delays each data decision to produce the delayed data decisions.

18. The method of claim 15, wherein the multiplying comprises setting an adjustable gain of a tap amplifier according to the corresponding adapted coefficient, with a delayed data decision an input to the tap amplifier, for each of the delayed data decisions.

19. The method of claim 15, further comprising:
translating the digital communication signal from a differential voltage input to two complementary differential pairs of current outputs as the feedforward signal in quad fully balanced current output form; and presenting the feedforward signal to the analog summing node in the quad fully balanced current output form.

20. The method of claim 15, wherein the subtracting at the analog summing node uses quad or more, differential, fully balanced current, full bridge signaling.

* * * * *